United States Patent [19]

Nomura et al.

[11] Patent Number: 5,529,716
[45] Date of Patent: Jun. 25, 1996

[54] LIQUID CRYSTAL POLYESTER RESIN COMPOSITION AND LAMP REFLECTOR

[75] Inventors: Hideo Nomura, Tsukuba; Kuniaki Asai, Tokyo; Mituo Maeda, Tsukuba, all of Japan

[73] Assignee: Sumitomo Chemical Company, Limited, Osaka, Japan

[21] Appl. No.: 265,716

[22] Filed: Jun. 24, 1994

[30] Foreign Application Priority Data

Jun. 25, 1993 [JP] Japan ................................. 5-154886

[51] Int. Cl.$^6$ ................................................. C09K 19/52
[52] U.S. Cl. ............................... 252/299.01; 428/1
[58] Field of Search ........................... 252/299.01; 428/1

[56] References Cited

U.S. PATENT DOCUMENTS

| | | | |
|---|---|---|---|
| 4,983,713 | 1/1991 | Hayashi et al. | 528/190 |
| 5,158,701 | 10/1992 | Asai et al. | 252/299.01 |
| 5,206,282 | 4/1993 | Frayer | 524/451 |
| 5,399,605 | 3/1995 | Yoshihara et al. | 524/377 |

FOREIGN PATENT DOCUMENTS

| | | |
|---|---|---|
| 2719429 | 11/1978 | Denmark . |
| 043797 | 1/1982 | European Pat. Off. . |
| 121457 | 10/1984 | European Pat. Off. . |
| 305158 | 3/1989 | European Pat. Off. . |
| 350222 | 1/1990 | European Pat. Off. . |
| 7240225 | 6/1974 | France . |
| 8807068 | 8/1990 | WIPO . |

*Primary Examiner*—Shean C. Wu
*Attorney, Agent, or Firm*—Cushman Darby & Cushman

[57] ABSTRACT

A liquid crystal polyester resin composition comprising (a) a liquid crystal polyester, (b) an aluminum powders, flakes and/or fibers, and if necessary (c) titanium oxide and/or talc, has high heat resistance and a small thermal storage even when exposed to high temperatures, and thus is useful for producing a lamp reflector hardly deformed by heat from a halogen lamp, etc.

14 Claims, No Drawings

LIQUID CRYSTAL POLYESTER RESIN COMPOSITION AND LAMP REFLECTOR

BACKGROUND OF THE INVENTION

This invention relates to a liquid crystal polyester resin composition and a lamp reflector made from said liquid crystal polyester resin composition, said liquid crystal polyester resin composition having high heat resistance, and a small thermal storage even if one surface of a molded article is exposed to relatively high temperatures caused by exposure to light from a halogen lamp, etc., and thus showing little deformation of the molded article.

Lamp reflectors, particularly head lamp reflectors for cars, have been made from a metallic material such as a steel plate, etc. and a glass material. But from recent tendency of attaching great importance to the exterior and design of cars, head lamp reflectors are to be required to have different designs depending on different kinds of cars. Therefore, resin materials which are excellent in molding processability and can be designed freely are going to be noticed as materials for head lamp reflectors.

As one of such resin materials, there is partially used a bulk molding compound (BMC), that is, unsaturated polyester reinforced with glass fibers, inorganic fillers, etc. due to its advantages in heat resistance and material cost. But the BMC also has problems in that it is not suitable for recycling and it generates flashes at the time of molding, resulting in requiring a troublesome aftertreating step.

Now, thermoplastic engineering plastics such as polycarbonates and polyphenylene sulfides excellent in molding processability are studying as a material for producing lamp reflectors. But since lamp reflectors made from these engineering plastics are deformed by heat when used in halogen lamps which generate high temperatures near light source or in projector type reflectors which can provide a large amount of light, such engineering plastics cannot be used for such a purpose. On the other hand, a lamp reflector made from a liquid crystal polyester is also deformed by heat, particularly used in a halogen lamp or as a projector type reflector.

SUMMARY OF THE INVENTION

It is an object of the present invention to provide a liquid crystal polyester resin composition which has high heat resistance and a small thermal storage even if one surface of a molded article is exposed to relatively high temperatures caused by exposure to light from a halogen lamp, etc., and thus shows little deformation of the molded article, overcoming the problems mentioned above. It is another object of the present invention to provide a lamp reflector made from the liquid crystal polyester resin composition.

The present invention provides a liquid crystal polyester resin composition comprising 100 parts by weight of a liquid crystal polyester, and 40 to 200 parts by weight of at least one member selected from the group consisting of an aluminum powder, aluminum flakes and aluminum fibers.

The present invention also provides a liquid crystal polyester resin composition comprising 100 parts by weight of a liquid crystal polyester, 40 to 195 parts by weight of at least one member selected from the group consisting of an aluminum powder, aluminum flakes and aluminum fibers, and 5 to 80 parts by weight of titanium oxide and/or talc, provided that a total amount of said at least one member selected from aluminum powder, aluminum flakes and aluminum fibers, and said titanium oxide and/or talc is 45 to 200 parts by weight.

The present invention further provides the liquid crystal polyester resin compositions mentioned above, wherein said liquid crystal polyester has repeating units of the formula:

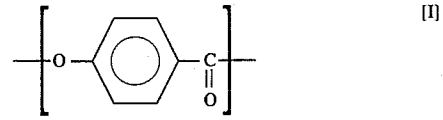

in an amount of 30% by mole or more in the liquid crystal polyester.

The present invention still further provides the liquid crystal polyester resin compositions mentioned above, wherein said liquid crystal polyester has a flow temperature of 340° C. or higher, said flow temperature being a temperature showing a molten viscosity of 48000 poises when measured by extruding the polyester heated with a temperature rise rate of 4° C./min under a load of 100 kgf/cm$^2$ from a nozzle of 1 mm in diameter and 10 mm in length.

The present invention also provide a lamp reflector made from the liquid crystal polyester resin compositions mentioned above.

DESCRIPTION OF THE PREFERRED EMBODIMENTS

A liquid crystal polyester resin does not cause entanglement even in a molten state due to a tough molecular structure and forms a polydomain having a crystalline state, and behaves to remarkably orient the molecular chain in the direction of flow under flow shear stress, and thus called generally as a melt-type liquid crystal (thermotropic liquid crystal) polymer. Due to this special behavior, the liquid crystal polyester resin is remarkably excellent in melt flowability and has a heat resistant deformation property of 300° C. or higher depending on its structure. Thus, it can be thought that such a liquid crystal polyester resin is suitable as a material for molding lamp reflectors.

But when a liquid crystal polyester is singly used for molding a lamp reflector, the resulting lamp reflector is often deformed finally when lighted on for a long period of time due to thermal storage in the polyester with the lapse of time. This tendency is remarkable when it is used for halogen lamps and in projector-type reflectors which are suitable for obtaining a high light amount.

In order to solve such a problem, the present inventors have studied earnestly and found that by mixing at least one member selected from the group consisting of aluminum powders, aluminum flakes and aluminum fibers with the liquid crystal polyester, and further by additionally mixing titanium oxide and/or talc with the above-mentioned mixture, the above-mentioned problem is solved.

The liquid crystal polyester used in the present invention is so-called as a thermotropic liquid polyester and obtained from the following ones:

(1) a combination of an aromatic dicarboxylic acid, an aromatic diol and an aromatic hydroxycarboxylic acid, (2) different kinds of aromatic hydroxycarboxylic acids, (3) a combination of an aromatic dicarboxylic acid and an aromatic diol, (4) A reaction product of a polyester such as polyethylene terephthalate and an aromatic hydroxycarboxylic acid, etc.

These polyesters form an anisotropic molten body at 400° C. or lower. It is possible to use one or more ester formable derivatives in place of the aromatic dicarboxylic acid, the aromatic diol and the aromatic hydroxycarboxylic acid mentioned above.

The liquid crystal polyester can have the following repeating units derived from aromatic hydroxycarboxylic acids:

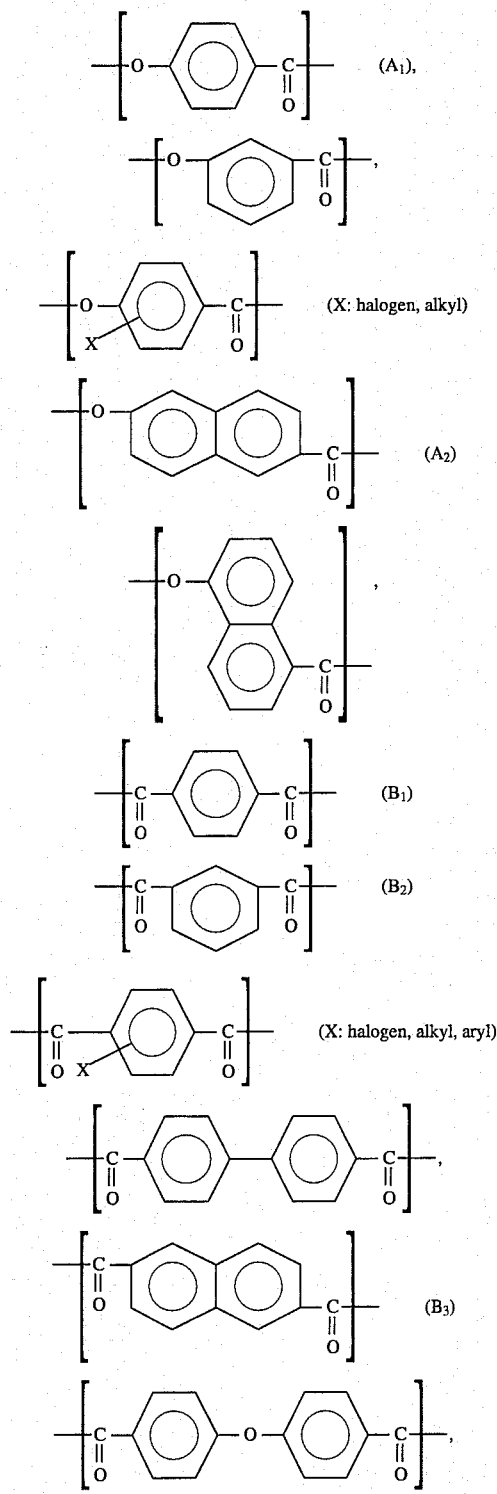

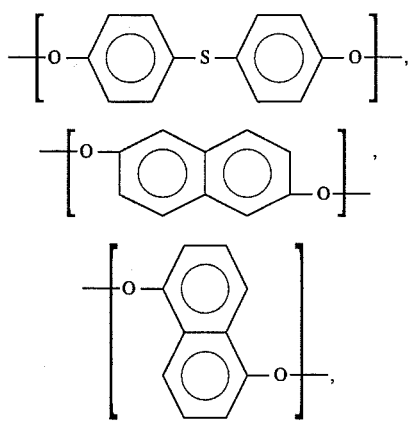

Considering the balance of heat resistance, mechanical properties, and moldability, the liquid crystal polyester having the repeating units of the formula:

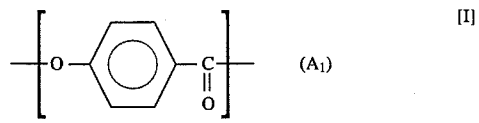

in an amount of 30% by mole or more is particularly preferable.

Preferable combinations of the repeating units are shown in the following (a) to (f):

(a): $(A_1)$, $(B_1)$ or a mixture of $(B_1)$ and $(B_2)$, $(C_1)$;

(b): $(A_1)$, $(A_2)$;

(c): a part of $(A_1)$ is replaced by $(A_2)$ in above (a);

(d): a part of $(B_1)$ is replaced by $(B3)$ in above (a);

(e): a part of $(C_1)$ is replaced by $(C_3)$ in above (a);

(f): $(B_1)$ and $(C_1)$ are added to above (b).

The fundamental structures (a) and (b) are disclosed in Japanese Patent Examined Publication Nos. 47-47870 and 63-3888.

As the aluminum powder, there can be used powdery metallic aluminum usually obtained by mechanical grinding or physicochemical powdering of metallic aluminum. For example, the aluminum powder can be prepared by a stamp mill method, an atomizing method from molten aluminum, etc. The particle size of the aluminum powder is 1000 μm or less in an amount of 90% by weight or more, more preferably 200 μm or less in an amount of 90% by weight or more, from the viewpoint of surface appearance of molded articles and uniform dispersibility in molded articles. Such aluminum powders are commercially available under trade names of AC-1003, AC-2500 (mfd. by Toyo Aluminium K.K.), etc.

As the aluminum flakes, there can be used scaly metallic aluminum, preferably passing through a 150 μm sieve in an amount of 90% by weight or more. The aluminum flakes are available commercially under a trade name of P-0100 (mfd. by Toyo Aluminium K.K.), etc.

As the aluminum fibers, there can be used fibrous metallic aluminum, which can be produced by a high frequency vibration method, cutting of aluminum wires, etc.

At least one member selected from the group consisting of aluminum powders, aluminum flakes and aluminum fibers is used in the liquid crystal polyester resin composition in an amount of 40 to 200 parts by weight, preferably 50 to 190 parts by weight, per 100 parts by weight of the liquid crystal polyester. When the amount is more than 200 parts by weight, the composition is inferior in melt kneadability, resulting in undesirably remarkably lowering a property of taking out of extruded articles and also lowering mechanical properties. On the other hand, when the amount is less than 40 parts by weight, the effect for preventing the objected thermal storage becomes undesirably insufficient.

As the titanium oxide, there can be used titanium dioxide ($TiO_2$) generally used as a white pigment having a large hiding power. There are two crystal forms, that is, anatase and rutile, wherein the anatase is semi-stable and transforms to the rutile which is stable at high temperatures. The particle size of titanium oxide is usually 0.10 to 0.40 μm. It is possible to use titanium oxide treated with a water-containing oxide of Al or Si, or an organic substance having good compatibility with the resin on the surface. The titanium oxide is available commercially under the trade names of Tiepake, CR-50, CR-60, A-100 (mfd. by Ishihara Sangyo Kaisha, Ltd.), KR 310 (mfd. by Titan Kogyo K.K.), etc.

As the talc, there can be used white fine powders having a chemical composition of $Mg_3(Si_4O_{10})(OH)_2$ and a three layer structure of $SiO_2$, $Mg(OH)_2$ and $SiO_2$, generally used as a lubricant. Talc usually has a weight average particle size of 1 to 10 μm. In the present invention, the talc having a weight average particle size of 5 μm or more is preferable. When the particle size is less than 5 μm, filling into screws at the time of melt kneading becomes poor due to slipping to make the weighing instable and taking out of extruded articles becomes worse. Further, impact strength is also lowered. On the other hand, there is no special upper limit of the average particle size. Considering surface appearance of molded articles and uniform dispersibility in molded articles, the average particle size of 50 μm or less is preferable. The talc is available commercially under the trade names of X-50 (mfd. by Nihon Talc, Ltd.), Talcan powder ®PK-C, Talcan HAYASHI NN (mfd. by Hayashi Kasei Co., Ltd.), etc.

By adding titanium oxide and/or talc to the liquid crystal polyester resin composition comprising a liquid crystal polyester and at least one member selected from the group consisting of aluminum powders, aluminum flakes and aluminum fibers (i.e. aluminum component), the surface of molded articles of the liquid crystal polyester resin composition can be made smoother.

In such a case, the amount of the aluminum component is 40 to 195 parts by weight, more preferably 50 to 190 parts by weight, per 100 parts by weight of the liquid crystal polyester. The amount of the titanium oxide and/or talc is 5 to 80 parts by weight, preferably 10 to 60 parts by weight, per 100 parts by weight of the liquid crystal polyester. When the amount is more than 80 parts by weight, granulation at the time of melt kneading undesirably becomes unstable. On the other hand, when the amount is less than 5 parts by weight, the effect of making the surface smoother becomes undesirably insufficient.

Further, the total amount of the aluminum component and titanium oxide and/or talc should be 45 to 200 parts by weight, more preferably 60 to 190 parts by weight, per 100 parts by weight of the liquid crystal polyester. When the total amount is more than 200 parts by weight, there take place disadvantages such as unstable weighing at the time of melt kneading, remarkable lowering in a property of taking out extruded articles and lowering in mechanical properties. On the other hand, when the total amount is less than 45 parts by weight, the effect of preventing thermal storage becomes undesirably insufficient.

The liquid crystal polyester resin composition may contain one or more conventional additives such as fibrous or needle-like reinforcing materials, e.g. glass fibers, silicaalumina fibers, wollastonite, carbon fibers, potassium titanate whiskers, etc.; inorganic fillers, e.g. calcium carbonate, dolomite, mica, clay, glass beads, etc.; mold release agents, e.g., fluorine resins; coloring agents such as dyes, pigments, etc.; antioxidants; heat stabilizers; ultraviolet absorbers; anti-static agents; surfactants; etc.

There is no particular limitation to mixing of raw materials for obtaining the desired composition. For example, a liquid crystal polyester, at least one aluminum component, and if necessary titanium oxide and/or talc, and further one or more reinforcing agents such as glass fibers, inorganic fillers, mold release agents, heat stabilizers, etc. are mixed using, for example, a Henschel mixer, a tumbling mixer, etc., followed by melt kneading using an extruder.

The lamp reflector of the present invention can be produced as mentioned below:

(1) A lamp reflector having a necessary design is processed by injection molding. The resulting molded article is preferably subjected to an annealing treatment in order to prevent generation of volatile matters from the molded article by the heat with the lights on, and to prevent whitening of the surface of the molded article. The annealing is preferably carried out at 300° C. or lower in the air or inert gas atmosphere for 2 hours or more.

(2) The lamp reflector molded article is coated with an undercoating agent. As the undercoating agent, a thermosetting or ultraviolet curing resin is usually used.

(3) The resulting undercoating layer is cured by heat or ultraviolet radiation.

(4) Vapor deposition of aluminum is carried out on the undercoating layer. The thickness of vapor deposited aluminum is usually 6 μm or less.

(5) A conventional top coating is carried out on the vapor deposited aluminum layer. For example, an acrylic thermosetting resin can be used for such a purpose.

(6) Heat treatment is carried out in a conventional manner.

The present invention is illustrated by way of the following Examples, in which all parts and percents are by weight unless otherwise specified.

In the Examples, the evaluation of the degree of deformation after the lamp lighting test, evaluations of various physical properties were conducted as follows.

(1) Evaluation of degree of deformation after lamp lighting test (Deformation)

After injection molding a molded article for lamp reflector having an inner diameter at the front face of 63 mm, and a hyperboloid with a length of 50 mm and a thickness of 2 mm from the view of lamp lighting direction (a front direction), vapor deposition of aluminum was carried out by the steps mentioned above. A halogen lamp of 12 V and 55 W was mounted on the lamp reflector and switched on for 240 hours. The degree of deformation of the lamp reflector was observed by the naked eye.

(2) Thermal conductivity

Using a test piece of 64 mm long, 64 mm wide and 15 mm thick, the thermal conductivity was measured according to JIS R 2618.

(3) Tensile strength

A dumbbell specimen #4 according to ASTM was molded and subjected to the measurement according to ASTM D638.

(4) Flexural modulus, Temperature of deflection under load (TDUL)

Test pieces of 127 mm long, 12.7 mm wide and 6.4 mm thick were molded and subjected to the measurements according to ASTM D790 and ASTM D648, respectively.

(5) Izod impact strength

A test piece for measuring flexural modulus (127 mm long, 12.7 mm wide and 6.4 mm thick) was molded and equally divided into two, which were subjected to the measurement of Izod impact strength according to ASTM D-256.

(6) Surface roughness Ra (μm)

Using a contact type surface roughness meter (SE-30D type, mfd. by Kosaka Laboratory Ltd.), the surface roughness was measured according to JIS B0601.

Examples 1 to 5, Comparative Examples 1 to 4

Liquid crystal polyester resin compositions were prepared by mixing a liquid crystal polyester having repeating units $(A_1)$ $(B_1)$ and $(C_1)$ in a molar ratio of $A_1 : B_1 : C_1 = 50 : 25 : 25$ and a flow temperature of 375° C., and aluminum powders (AC-1003, mfd. by Toyo Aluminium K.K.; under 150 μm, 95% or more, under 45 μm, 65 to 85%) in proportions as shown in Table 1 in a Henschel mixer, followed by granulation using a biaxial extruder (PCM-30 type, mfd. by Ikegai Iron Works Ltd.) at a cylinder temperature of 390° C.

A liquid crystal polyester resin composition containing no aluminum powders (Comparative Example 1) or containing 67 parts of glass fibers (EFH 75-01, mfd. by Central Glass Co., Ltd.) in place of aluminum powders (Comparative Example 2) was prepared in the same manner as mentioned above.

Using these resin compositions, the thermal conductivity, temperature of deflection under load, tensile strength, flexural modulus, and Izod impact strength were measured and listed in Table 1. Further, lamp reflector were molded by the process mentioned above, and subjected to the evaluation of degree of deformation after lamp lighting test. The results are also listed in Table 1.

As is clear from the results of Table 1, the liquid crystal polyester resin compositions of the present invention (Examples 1 to 5) including aluminum powders are high in the thermal conductivity compared with the liquid crystal polyester resin composition containing no aluminum powders (Comparative Example 1) and that containing glass fibers in place of the aluminum powders (Comparative Example 2). Further, the surface roughness (Ra) of the molded lamp reflector was 0.5 μm. As to the deformation of the lamp reflectors after lamp lighting test, the deformation was admitted in Comparative Examples 1 and 2, while no deformation was admitted in Examples 1 to 5.

When the adding amount of aluminum powders was less than 40 parts (Comparative Example 3), the improvement of thermal conductivity was insufficient and the deformation after the lamp lighting test was admitted. On the other hand, when the adding amount of aluminum powder was more than 200 parts (Comparative Example 4), the taking out of extruded article at the time of granulation was remarkably bad, and lower values were shown in the tensile strength, and Izod impact strength.

TABLE 1

| Example No. | Composition (parts) Liquid crystal polyester | Aluminum material | Glass fibers | Thermal conductivity (W/mk) | TDUL (°C.) | Tensile strength (kg/cm$^2$) | Flexural modulus (kg/cm$^2$) | Izod impact strength (kg · cm/cm) | Deformation | Melt kneadability*[1] |
|---|---|---|---|---|---|---|---|---|---|---|
| Example 1 | 100 | Aluminum powder 54 | 0 | 0.93 | 332 | 1120 | 119000 | 44 | No | o |
| Example 2 | 100 | Aluminum powder 67 | 0 | 1.05 | 331 | 1050 | 113000 | 40 | No | o |
| Example 3 | 100 | Aluminum powder 100 | 0 | 1.17 | 329 | 930 | 107000 | 31 | No | o |
| Example 4 | 100 | Aluminum powder 150 | 0 | 1.44 | 313 | 780 | 111000 | 17 | No | o |
| Example 5 | 100 | Aluminum powder 186 | 0 | 1.60 | 307 | 710 | 104000 | 13 | No | o~Δ |
| Comparative Example 1 | 100 | Aluminum powder 0 | 0 | 0.51 | 352 | 1610 | 135000 | 60 | Yes (great) | o |
| Comparative Example 2 | 100 | Aluminum powder 0 | 67 | 0.59 | 335 | 1130 | 124000 | 45 | Yes (great) | o |
| Comparative Example 3 | 100 | Aluminum powder 25 | 0 | 0.68 | 335 | 1290 | 123000 | 50 | Yes (Small) | o |
| Comparative Example 4 | 100 | Aluminum powder 233 | 0 | 1.71 | 298 | 580 | 95000 | 6 | No | x |

Note)
*[1] o: Good
Δ: Extruded article was slightly brittle, and taking out property was unstable.
x: Extruded article was brittle, and taking out property was remarkably bad.

EXAMPLES 6 TO 10, COMPARATIVE EXAMPLES 5 AND 6

Liquid crystal polyester resin compositions were prepared in the same manner as described in Example 1 except for using aluminum flakes (P-0100, mfd. by Toyo Aluminium K.K.; under 45 μm, 98% or more) in amounts as listed in Table 2 in place of the aluminum powders.

The same tests as those of Example 1 were carried out and listed in Table 2.

As shown in Table 2, the liquid crystal polyester resin compositions of the present invention shows high thermal conductivity and no deformation after the lamp lighting test.

EXAMPLES 11 TO 13

Liquid crystal polyester resin compositions were prepared in the same manner as described in Example 1 except for using aluminum fibers (60 to 90 μm in diameter, 3 mm long) in addition to aluminum powders or using glass fibers.

The same tests as those of Example 1 were carried out and listed in Table 2.

As shown in Table 2, the liquid crystal polyester resin compositions containing aluminum powders and aluminum fibers and the liquid crystal polyester resin composition containing aluminum powders, aluminum fibers and glass fibers show high thermal conductivity and no deformation after lamp lighting test.

TABLE 2

| Example No. | Composition (parts) Liquid crystal polyester | Aluminum material | Aluminum fibers | Glass fibers | Thermal conductivity (W/mk) | TDUL (°C.) | Tensile strength (kg/cm$^2$) | Flexural modulus (kg/cm$^2$) | Izod impact strength (kg · cm/cm) | Deformation | Melt kneadability |
|---|---|---|---|---|---|---|---|---|---|---|---|
| Example 6 | 100 | Aluminum flakes 54 | 0 | 0 | 1.09 | 323 | 960 | 101000 | 32 | No | o |
| Example 7 | 100 | Aluminum flakes 67 | 0 | 0 | 1.24 | 319 | 870 | 93000 | 28 | No | o |
| Example 8 | 100 | Aluminum flakes 100 | 0 | 0 | 1.35 | 313 | 770 | 95000 | 21 | No | o |
| Example 9 | 100 | Aluminum flakes 150 | 0 | 0 | 1.78 | 310 | 710 | 94000 | 13 | No | o~Δ |
| Example 10 | 100 | Aluminum flakes 186 | 0 | 0 | 1.92 | 304 | 660 | 91000 | 11 | No | o~Δ |
| Comparative Example 5 | 100 | Aluminum flakes 25 | 0 | 0 | 0.75 | 327 | 1140 | 113000 | 36 | Yes (small) | o |
| Comparative Example 6 | 100 | Aluminum flakes 233 | 0 | 0 | 2.02 | 291 | 480 | 88000 | 4 | No | x |

TABLE 2-continued

| Example No. | Composition (parts) | | | | Thermal conductivity (W/mk) | TDUL (°C.) | Tensile strength (kg/cm²) | Flexural modulus (kg/cm²) | Izod impact strength (kg · cm/cm) | Deformation | Melt kneadability |
|---|---|---|---|---|---|---|---|---|---|---|---|
| | Liquid crystal polyester | Aluminum material | Aluminum fibers | Glass fibers | | | | | | | |
| Example 11 | 100 | Aluminum powder 80 | 20 | 0 | 1.31 | 326 | 810 | 98000 | 23 | No | o |
| Example 12 | 100 | Aluminum powder 100 | 50 | 0 | 1.99 | 316 | 670 | 108000 | 14 | No | o |
| Example 13 | 100 | Aluminum powder 125 | 0 | 25 | 1.13 | 325 | 800 | 120000 | 16 | No | o |

EXAMPLES 14 TO 17

Liquid crystal polyester resin compositions were prepared in the same manner as described in Example 1 except for adding titanium oxide (CR-60, mfd. by Ishihara Sangyo Kaisha, Ltd.) or talc (X-50, mfd. by Nihon Talc., Ltd.) in addition to aluminum powders as shown in Table 3.

The same tests as those of Example 1 were carried out and listed in Table 3.

The molded lamp reflectors had a surface roughness Ra of as small as 0.2 μm, respectively.

As shown in Table 3, Examples 14 to 17 show high thermal conductivity and no deformation after lamp lighting test with good surface state.

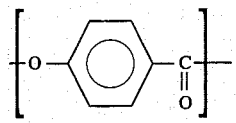

in an amount of 30% by mole or mole in the liquid crystal polyester, said liquid crystal polyester having a flow temperature of at least 340° C., said flow temperature being a temperature showing a molten viscosity of 48,000 poises when measured by extruding said liquid crystal polyester heated at a temperature rising rate of 4° C./minute under a load of 100 kgf/cm² from a nozzle of 1 mm in diameter and a 10 mm in length, and

TABLE 3

| Example No. | Composition (parts) | | | Thermal conductivity (W/Mk) | TDUL (°C.) | Tensile strength (kg/cm²) | Flexural modulus (kg/cm²) | Izod impact strength (kg · cm/cm) | Deformation | Melt kneadability[1] |
|---|---|---|---|---|---|---|---|---|---|---|
| | Liquid crystal polyester | Aluminum material | Inorganic filler | | | | | | | |
| Example 14 | 100 | Aluminum powder 60 | Titanium oxide 40 | 1.01 | 330 | 970 | 103000 | 24 | No | o |
| Example 15 | 100 | Aluminum powder 80 | Titanium oxide 20 | 1.10 | 330 | 950 | 105000 | 26 | No | o |
| Example 16 | 100 | Aluminum powder 60 | Talc 40 | 0.97 | 329 | 940 | 117000 | 20 | No | o |
| Example 17 | 100 | Aluminum powder 80 | Talc 20 | 1.05 | 330 | 910 | 113000 | 21 | No | o |

[1] o: Good

As mentioned above, the liquid crystal polyester resin composition of the present invention has high heat resistance in itself and when molded into a lamp reflector, it is hardly deformed due to small thermal storage even if one surface of the molded article is exposed to a relatively high temperature caused by lighting of a halogen lamp, etc. Further, when a lamp reflector made from the liquid crystal polyester resin composition is used for a long period of time for a high light amount of lamp, the deformation is very small. Further, when titanium oxide or talc is added to the liquid crystal polyester resin composition of the present invention, the resulting molded articles have smoother surfaces.

What is claimed is:

1. A liquid crystal polyester resin composition for a lamp reflector comprising:

100 parts by weight of a liquid crystal polyester wherein said liquid crystal polyester has repeating units of the formula:

40 to 200 parts by weight of at least one member selected from the group consisting of an aluminum powder, aluminum flakes and aluminum fibers.

2. A liquid crystal polyester resin composition for a lamp reflector comprising:

100 parts by weight of a liquid crystal polyester, wherein said liquid crystal polyester has repeating units represented by the formula:

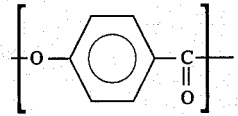

in amount of 30% by mole or mole in the liquid crystal polyester, said liquid crystal polyester having flow temperature of at least 340° C., said flow temperature being a temperature showing a molten viscosity of 48,000 poises when measured by extruding said liquid crystal polyester heated with a temperature rising rate of 4° C./minute under a load of 100 kgf/cm² from a nozzle having a diameter of 1 mm and a length of 10 mm, 40 to 195 parts by weight of at least one member selected from the group consisting of an aluminum powder, aluminum flakes and aluminum fibers, and 50 to 80 parts by weight of titanium oxide and/or talc, wherein the total amount of said at least one member selected from aluminum powder, aluminum flakes and aluminum fibers, and said titanium oxide and/or talc is 45 to 200 parts by weight.

3. A process for using the liquid crystal polyester resin composition of claim 1 in the production of a lamp reflector.

4. A process for using the liquid crystal polyester resin composition of claim 2 in the production of a lamp reflector.

5. A lamp reflector obtained by molding a liquid crystal polyester resin composition comprising:

100 parts by weight of a liquid crystal polyester having repeating units of the formula:

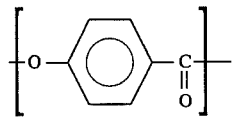

in an amount of 30% by mole or more in the liquid crystal polyester and having a flow temperature of 340° C. or higher, and 40 to 200 parts by weight of at least one member selected from the group consisting of an aluminum powder, aluminum flakes and aluminum fibers.

6. A lamp reflector according to claim 5, wherein the resin composition further comprises:

5 to 80 parts by weight of at least one member selected from the group consisting of titanium oxide and talc, provided that the total amount of said at least one member selected from aluminum powder, aluminum flakes and aluminum fibers, and at least one member selected from titanium oxide and talc is 45 to 200 parts by weight.

7. A lamp reflector according to claim 5, which further comprises an undercoating layer, an aluminum layer formed thereon and a top coating thereover.

8. A lamp reflector according to claim 6, which further comprises an undercoating layer, an aluminum layer formed thereon and a top coating thereover.

9. A lamp reflector according to claim 5, wherein the aluminum powder has a particle size of 100 μm or less in an amount of 90% by weight or more.

10. A lamp reflector according to claim 5, wherein the aluminum flakes have a size passing through a 150 μm sieve in an amount of 90% by weight or more.

11. A lamp reflector according to claim 6, wherein the titanium oxide has a particle size of 0.10 to 0.40 μm.

12. A liquid crystal polyester resin composition according to claim 1, wherein the aluminum powder has a particle size of 200 μm or less in an amount of 90% by weight or more.

13. A liquid crystal polyester resin composition according to claim 1, wherein the aluminum flakes have a size passing through a 150 μm sieve in an amount of 90% by weight or more.

14. A liquid crystal polyester resin composition according to claim 2, wherein the titanium oxide has a particle size of 0.10 to 0.40 μm.

* * * * *